April 12, 1932.  P. BERTELL  1,853,254
BRACKET AND MEANS OF ATTACHING SAME TO A CLOTH COVERED MEMBER
Original Filed Dec. 17, 1929
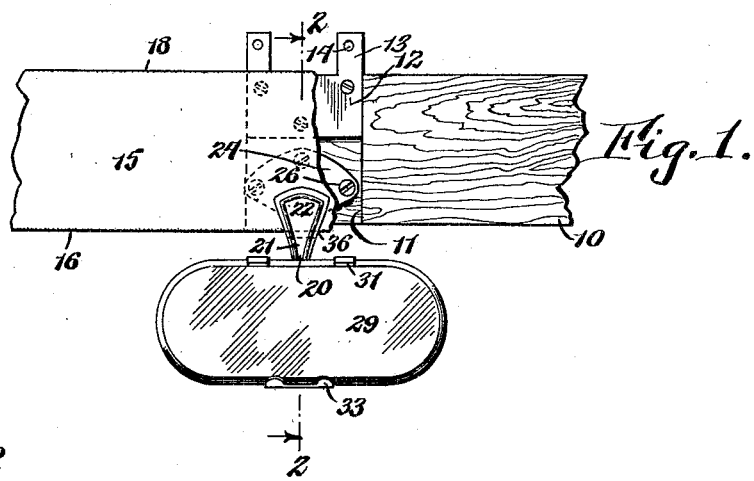
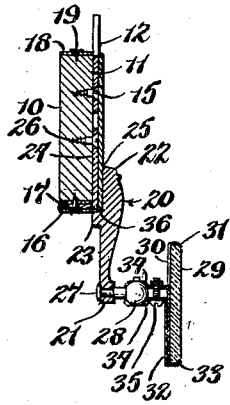
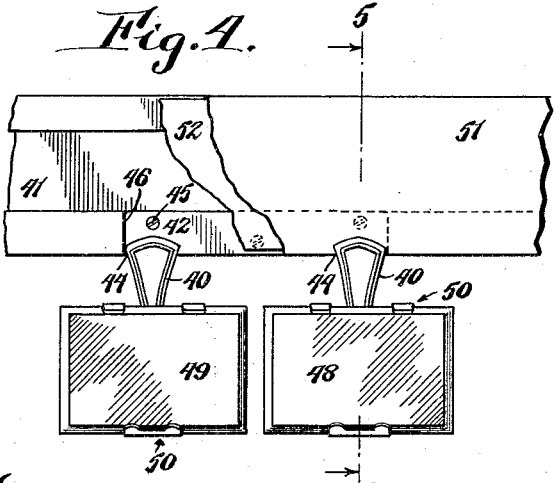
  
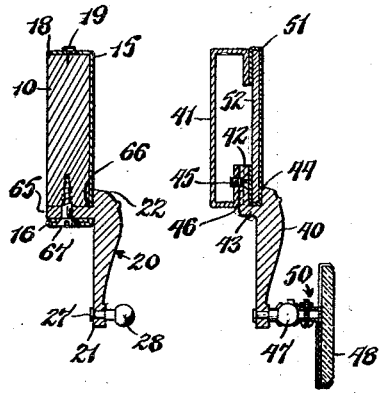
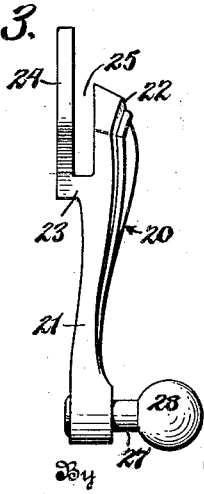
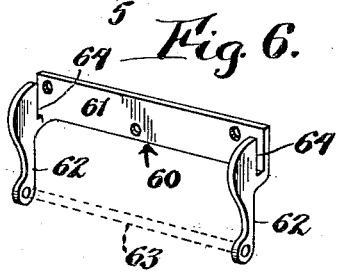
Inventor
Paul Bertell
By Popp and Powers
Attorneys Patented Apr. 12, 1932

1,853,254

UNITED STATES PATENT OFFICE

PAUL BERTELL, OF KENMORE, NEW YORK, ASSIGNOR TO STANDARD MIRROR COMPANY, INC., OF BUFFALO, NEW YORK, A CORPORATION OF NEW YORK

BRACKET AND MEANS OF ATTACHING SAME TO A CLOTH COVERED MEMBER

Application filed December 17, 1929, Serial No. 414,679. Renewed November 10, 1931.

This invention relates to a bracket and a method of attaching it to a member provided with a covering material, and is more particularly intended as a bracket for supporting an instrument such as a rear vision mirror from the cloth or leather covered head bar of an enclosed automobile, altho the features of the invention can also be applied in many other uses.

The present tendency in automobile design is to avoid exposed screws and attaching parts in the interior hardware of enclosed cars as much as possible, such exposed attaching plates, ears, screws or the like being more or less unsightly, particularly when a large number of pieces of hardware are provided in a small space such as within an automobile.

The principal object of this invention, therefore, is to provide a bracket arm for rear vision mirrors or other instruments and a method of attaching it to the cloth or leather covered head bar of an automobile windshield so that its attaching part or plate is concealed under the cloth or leather and completely concealed, and the only exposed part being an artistically formed arm which projects out from the smooth and uninterrupted cloth, leather or otherwise covered surface of the head bar. By this means the attaching plate and its screws, both of which must be comparatively large and accordingly more or less unsightly to provide the necessary strength, are completely concealed, and the only exposed part is the instrument supporting arm which can be formed so as to provide an attractive addition to harmonize with the interior hardware of the car.

Another object is to provide such a bracket which is made in one piece and in the form of a simple casting or stamping thereby being inexpensive to produce and at the same time is strong and durable to support the rear vision mirror or other instrument firmly and rigidly.

A further purpose is to provide such a bracket which is easily and quickly applied, particularly when applied as the standard equipment of an automobile in which case it is applied during the course of construction of the automobile.

In the accompanying drawings:

Figure 1 is a front elevation of a cloth covered or leather covered head bar for enclosed cars showing a rear vision mirror supported by a bracket embodying the preferred form of my invention, a part of the cloth or leather being removed to disclose the construction.

Figure 2 is a vertical section taken on line 2—2, Fig. 1.

Figure 3 is a side elevation of a detached bracket of the form shown in Figs. 1 and 2.

Figure 4 is a view similar to Fig. 1 showing a modified form of the invention.

Figure 5 is a vertical section taken on line 5—5, Fig. 4.

Figure 6 is a perspective view showing the invention embodied in another form of bracket.

Figure 7 is a view similar to Fig. 2 showing a further modification of the invention.

Similar reference numerals refer to like parts in each view.

In its general organization this invention comprises a bracket for supporting a rear vision mirror or other instrument from a cloth or leather covered windshield head bar or other member which bracket comprises an attaching plate and an integrally formed arm of artistic configuration projecting forwardly from said attaching plate, the bracket being provided with a slot between the attaching plate and the arm. In applying the bracket the attaching plate is first screwed or otherwise secured to the uncovered head bar, the cloth or leather is slitted and the cloth fitted to the head bar so that the bracket arm is projeced through the slit, the cloth is secured in place and the edge of the cloth at said slit is tucked into said slot and can then be cemented in place. As a result the attaching plate and its screws are entirely concealed by the cloth and the arm has the appearance of projecting outwardly from the upholstered head bar with no visible attaching means whatsoever.

Another method is to secure the attaching plate to the uncovered head bar, apply the cloth or leather to a card, the edges of the cloth or leather extending around and ending on the back of the card and then slipping the covered card so that one edge is arranged in the slot of the bracket. The card is then fastened in place and as with the other method, the arm has the appearance of projecting outwardly from the upholstered head bar with no visible attaching means.

The head bar 10 shown in Figures 1, 2, and 7 is made of wood, this head bar forming the upper part of the windshield frame (not shown) in enclosed cars. This head bar 10 is provided in its inner vertical face with a shallow comparatively wide groove 11 in which a metal plate 12 is normally secured to the head bar. This metal plate is provided with a pair of upwardly projecting ears 13 which have holes 14 by which the plate is secured to the adjacent part of the roof structure (not shown). The head bar 10 and all but the ears 13 of the plate 12 are covered with a suitable material, this material being shown as composed of a flexible material such as cloth or leather 15 or the like. The lower edge 16 of the piece of cloth or leather 15 used for this purpose is preferably secured to the under side of the head bar 10 by a strip 17 between which and the head bar 10 the lower edge of the cloth 15 is tacked and the cloth piece 15 is passed around the head bar 10 so as to cover the strip 17, and the front face of the head bar, as best shown in Fig. 2. The upper edge 18 is tacked as at 19 to the upper side of the head bar which is normally concealed.

The bracket embodying one form of the present invention is preferably attached before the head bar 10 is covered with the piece of cloth or leather 15 as hereinafter described.

As shown in Fig. 3, this bracket consists of an ornamented arm 20 having a depending part 21 and an upper part 22 which projects upwardly from a horizontal web 23 which projects rearwardly from the arm 20 and is formed integrally therewith. This arm, which is exposed, can be of any artistic configuration to suit the other hardware of the car but is preferably comparatively narrow to reduce its bulk and to impart grace. Formed integrally with the web 23 and projecting upwardly therefrom is an attaching plate 24, this plate being comparatively wide and flat to permit of its being firmly secured to the front face of the head bar 10. It is therefore apparent that the upwardly projecting part 22 of the bracket arm 20, the web 23 and the attaching plate 24 together form a slot 25 in the bracket. As shown, this plate 24 is arranged in the lower part of the shallow groove or recess 11 and is secured to the head bar by screws 26 or in any other suitable manner. It is not essential, however, that the head bar 10 be provided with a groove 11 to practice the invention since the attaching plate 24 being comparatively flat can be secured directly to the front face of the head bar 10 without producing any noticeable bulge when the cloth 15 is applied over it, particularly when the usual padding (not shown) is applied to the head bar before the cloth or leather covering 15 is applied.

To the lower end of the depending part 21 of the supporting arm 20, a forwardly projecting pin 27 is secured, this pin being formed at its front end to provide a ball 28. The rear vision mirror 29 can be attached for universal movement on this ball in any suitable manner. As shown the mirror plate 29 is carried by an inner rear plate 30 which is formed to provide fingers 31 which engage the upper margin or bevel of the mirror and an outer rear plate 32 having fingers 33 which engage the lower margin or bevel of the mirror plate. These rear plates 30 and 32 are each formed to provide rearwardly projecting arms or ears 34 which are formed to provide opposing sockets. These sockets jointly receive the ball 28 and are compressed against the ball to provide a friction joint by bolts 35 which also draw the plates 30 and 32 together so as to securely hold the mirror 29 therebetween. While this form of mounting the rear vision mirror 29 on the ball 28 has been shown and described the same forms no part of the present invention and it will be understood that any suitable form of mounting can be used.

In assembling the structure shown in Figs. 1–3, the piece of upholstering cloth 15 is slitted as indicated at 36 and the lower edge of the piece of cloth 15 is tacked to the underside of the head bar 10 by means of the strip 17. The attaching plate 24 is then placed in the shallow groove or recess and the screws 26 tightened so as to secure the bracket 20 permanently to the head bar 10. The piece of cloth is then stretched until the bracket arm 20 (without the mirror) can be slipped into the slit 36 so that the ball 28, stem 27, depending part 21 and upwardly extending part 22 of the bracket arm 20 are projected through the slit 36 in the piece of cloth 15. The upper edge of the slit 36 is then tucked into the slot 25 of the bracket so that the cloth will completely cover the attaching plate 24. The upper part of the cloth is then stretched over the front face of the head bar and the upper edge thereof is then tacked to the upper side of the head bar 10 by the tacks 19. If deemed advisable a suitable cement can be applied to the inside of the cloth around the slit 36 either before or after tacking the cloth and the cloth can be pressed against the attaching plate 24 and the head bar 10 as to cement the cloth thereto at this place, but the appearance of the assembly is entirely satisfactory without such cementing. Thereafter the rear vision mirror 29 or other object to be supported by the arm 21 can be applied to the ball 28 and the installation is complete. When the installation is complete, the large and unattractive attaching plate 24 and its screws are completely concealed and the relatively thin graceful arm has the appearance of being projected outwardly from a smooth and uninterrupted cloth covered surface without any visible attaching means. It is apparent that the precise manner of applying the cloth can be varied considerably to suit different conditions for example the slitted cloth can first be slipped over the bracket and then tacked in place.

In Figs. 4 and 5 a modified construction is shown in which two bracket arms 40 are attached to a metal head bar 41, this metal head bar 41 being of any suitable form and the interior thereof being available for the motor of a windshield wiper, windshield opening devices etc (not shown). In this form the bracket arms 40 are integrally connected to the ends of a supporting plate 42 by webs 43, the webs 43, attaching plate 42 and bracket arms 40 forming slots 44 similar to the slots 25 in the preferred construction. The attaching plate 42 is secured to the metal head bar 41 by bolts 45 or in any other suitable manner, the metal head bar 41 being preferably, although not necessarily, depressed, as indicated at 46 to receive the attaching plate 42. If desired a wooden filler block (not shown) can be arranged in the head bar 41 and the bracket arms 40 can be attached to this wooden block. At the lower end of each bracket arm 40 a ball 47 is provided in the same manner as the ball 28 of the preferred construction and to these balls a rear vision mirror 48 and a side vision mirror 49 or any other instrument can be attached in any suitable manner as by attaching means 50 similar to the means for attaching the rear vision mirror 29 in the preferred construction. With this construction, the piece of cloth 51 which is used for facing the head bar 41 is secured to a fiber board 52 or the like, the edges of the cloth 51 being turned around and suitably secured to the rear edges of the fiber board 52 as indicated in Fig. 5.

With this form of the invention, the attaching plate 42 is first bolted to the head bar 41 with or without the mirrors 48, 49 or other instruments on the bracket arms. The fiber board 52 with its cloth facing 51 is then slipped into the grooves or slots 44 of the brackets so that it completely covers the front face of the head bar 41 and also the attaching plate 42 and its bolts 45. The fiber board 52 and its cloth covering are then fastened in place and the same effect is obtained as with the first construction, i. e. the attaching plate is substantially concealed and the arms 40 appear to project from a smooth and uninterrupted cloth covered surface without visible attaching means. It is obvious that the second form of the invention illustrated in Figs. 4 and 5 can also be embodied in a construction having one bracket arm 40 as in the first form of the invention.

It is apparent that the invention is not limited to the form of bracket arm and ball shown in Figs. 1–5 but that it is applicable to almost every form of rear view mirror or other instrument bracket of this character. For example, a bracket 60 is illustrated in Fig. 6 having a supporting plate 61 and depending, forwardly projecting arms 62, these arms being formed at their ends to support a rod 63 on which the rear view mirror or other instrument can be hung in any suitable manner. The arms 62 are formed to provide slots 64 between the upper ends of these arms and the supporting plate, these slots being adapted to receive the edges of the leather or cloth upholstering, this leather or cloth concealing the supporting plate 61 as in the other forms of the invention.

In the form of the invention shown in Fig. 7, the bracket arm 20 is provided with a single horizontal rearwardly projecting ear 65 having a series of vertical holes extending therethrough In this form, the upholstering, which is shown applied as in Figs. 1, 2 and 4 is provided with a slit 66, this slit being located over the fold of the cloth or leather over the lower front corner of the head bar 10. After the cloth or leather 15 has been applied, the ear 65 is passed through the slit and between the under side of the head bar and the upper side of the reverse fold of the cloth or leather 15. The fastening screws 67 are then applied, these screws being passed through the lower reverse fold of the cloth or leather 15, through the holes in the ear 65 and into the head bar 10. In this form of the invention, while the screw heads of the screws 67 are not entirely concealed they are so disposed as not to be readily visible, especially as the heads of these screws sink a substantial distance into the double thickness of the cloth or leather 15 at the bottom of the head bar 10.

As a whole both forms of the present invention provide a simple, strong and inexpensive bracket for rear vision mirrors or the like which is readily applied to a cloth covered surface and when so applied the parts for attaching the bracket are completely concealed by the cloth. The bracket as a whole can therefore be made attractive and graceful and an artistic addition harmonizing with the hardware of enclosed automobiles or other vehicles.

I claim as my invention:

1. A bracket for supporting a mirror or the like from a member provided with a covering, said bracket being formed to provide a part arranged between said member and its covering and adapted to be fastened to said member whereby said part is concealed by said covering and said bracket being formed to provide a part which overlies said covering.

2. A bracket for supporting a mirror or the like from a member provided with a covering, said bracket being formed to provide a comparatively flat and thin part arranged between said member and its covering and adapted to be fastened to said member and said bracket being formed to provide a part which overlies said covering.

3. A bracket for supporting a mirror or the like from a member provided with a covering, said bracket being formed to provide a compartively flat and wide part arranged between said member and its covering and adapted to be fastened to said member and said bracket being formed to provide a part which is arranged in front of said attaching part and overlies said covering.

4. A bracket for supporting a mirror or the like from a member provided with a covering, said bracket being provided with a slot receiving the covering, that part of the bracket on one side of said slot being adapted to be fastened to said member and to be arranged between said covering and said member and that part of said bracket on the opposite side of said slot being wholly exterior of said covering.

5. A bracket for supporting a mirror or the like from a member provided with a covering, said bracket comprising an attaching plate adapted to be attached to said member and to be arranged between said covering and said member and an integrally formed arm arranged outside of said covering, said bracket being provided with a slot between said arm and plate, said slot being adapted to receive an edge of said covering whereby the attaching means for said bracket are concealed.

6. A bracket for supporting a mirror or the like from a member provided with a covering and also provided with a depression on one face, said bracket comprising an attaching plate adapted to be arranged in the depression and between said covering and said member and adapted to be attached to said member and an integrally formed arm arranged outside of said covering, said bracket being provided with a slot between said arm and plate, said slot being adapted to receive the edge of said covering whereby the attaching means for said bracket are concealed.

7. A bracket for supporting a mirror or the like from a member provided with a flexible covering, said covering being provided with a slit, comprising an attaching plate adapted to be attached to said member and arranged between said covering and said member and an arm adapted to project through said slit, said bracket being provided with a slot between said arm and plate, said slot being adapted to receive the edge of said covering around said slit whereby the attaching means for said bracket are concealed.

8. A bracket for supporting a mirror or the like from a member having a covered card attached thereto, comprising an attaching member adapted to be secured to said member, an integrally formed arm projecting outwardly therefrom, said bracket being provided with a slot between said arm and attaching member, said slot being adapted to receive the edge of said covered card, whereby said attaching member is substantially concealed by said covered card.

In testimony whereof I hereby affix my signature.

PAUL BERTELL.